(No Model.)

P. M. SHARPLES.
ANTI-FRICTION STEP FOR SHAFTS.

No. 388,457. Patented Aug. 28, 1888.

WITNESSES:
C. J. Dwight.
Ida F. Kinsey.

INVENTOR:
Philip M. Sharples,
BY W. J. Stewart
ATTORNEY.

United States Patent Office.

PHILIP M. SHARPLES, OF WEST CHESTER, PENNSYLVANIA.

ANTI-FRICTION STEP FOR SHAFTS.

SPECIFICATION forming part of Letters Patent No. 388,457, dated August 28, 1888.

Application filed March 10, 1888. Serial No. 266,834. (No model.)

*To all whom it may concern:*

Be it known that I, PHILIP M. SHARPLES, a citizen of United States, residing at West Chester, in the county of Chester and State of Pennsylvania, have invented certain new and useful Improvements in Anti-Friction Steps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a device intended particularly for supporting rapidly-rotating shafts with a reduced amount of wear and friction. It is adapted, however, not only to take the end-pressure of the shaft, but also to serve as an anti-friction bearing for it, and the end of the shaft may extend beyond the device and have an independent guide-bearing or a further connection, if desired.

Figure 1:
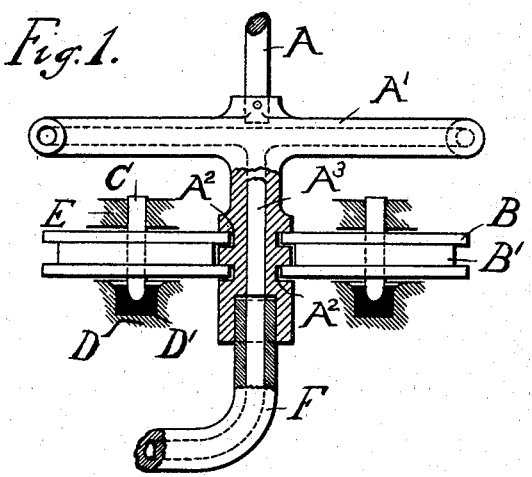
Figure 3:
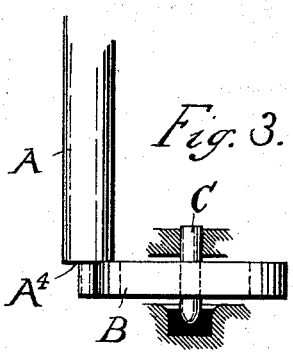
Figure 2:
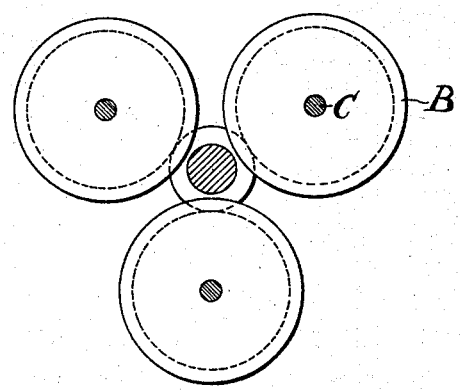

Figure 1 is an elevation showing a hollow shaft extending below the anti-friction step and having a fixed connection. Fig. 2 is a plan showing three supporting-disks. Fig. 3 is an elevation showing a single disk adapted merely to take the end-pressure of the shaft.

A is a vertical rotating shaft. In Fig. 1 this is represented as rotated by a reaction-wheel, A', which is supplied with its motive force through the hollow shaft communicating with the fixed supply-pipe F. Circular grooves $A^2$ are cut in the shaft above this fixed connection, with which the grooved face B' of the horizontal disks B engage. These disks revolve upon or with shafts C, parallel with the shaft A, and supported in top and bottom bearings, E and D, the latter being provided with a leather step, D'. In Fig. 3 the end or shoulder $A^4$ of the shaft A rests upon a side face of a disk, B, near its periphery. In Fig. 2 three disks are shown, which engage the grooves of the shaft, so as to not only take the longitudinal pressure, but also to confine the shaft, so as to serve the purpose of a complete anti-friction bearing.

I am aware that rotary shafts have been supported on disks or wheels adapted to be revolved in the same plane as the shaft, the weight in these cases pressing upon the curved surface of the wheel at right angles to its supporting-shaft. In my device the rotating shaft rests upon the flat face of the supporting-disk, the shaft of the latter being parallel with the rotating shaft. The disk is thus rotated at a reduced speed. The rotating shaft may be supported at any part of its length, and the disk may be so arranged as to serve the purpose of the bearing which would ordinarily be required, as shown in Fig. 2, previously referred to. For merely taking the longitudinal strain of the shaft, a single disk may be used. The shaft may be extended to any desired distance below the disks and provided with any ordinary bearing, or any desired connection may be made. The rotating shaft may be vertical, horizontal, or inclined.

The principle of my invention is to transfer the end-pressure of a rapidly-rotating shaft to one which will rotate at a reduced speed. The grooves cut directly in the shaft are of small diameter compared with the disk, and the shaft of the latter is consequently rotated at a greatly-reduced speed, and can be more easily kept cool.

What I desire to secure by Letters Patent are the following claims:

1. The combination, with a rotating shaft having circular grooves $A^2$, of a disk of larger diameter than said shaft, with grooved face engaging said circular grooves, substantially as and for the purpose set forth.

2. The combination, with a rotating hollow shaft having intermediate circular groove or grooves and communicating with a fixed pipe, F, of one or more disks adapted to engage said grooves and to revolve in a plane at right angles to said shaft, substantially as set forth.

In testimony whereof I affix my signature in presence of two witnesses.

PHILIP M. SHARPLES.

Witnesses:
 JOS. T. PRICE,
 MARTHA SHARPLES.